United States Patent [19]

Ackeret

[11] 4,141,541

[45] Feb. 27, 1979

[54] HAND UTENSIL FOR HOLDING A CITRUS FRUIT

[75] Inventor: Peter Ackeret, Kusnacht, Switzerland

[73] Assignee: Zyliss Zysset AG, Lyss, Switzerland

[21] Appl. No.: 768,163

[22] Filed: Feb. 14, 1977

[30] Foreign Application Priority Data

Dec. 15, 1976 [DE] Fed. Rep. of Germany ....... 2656732

[51] Int. Cl.² .............................................. B25B 1/20
[52] U.S. Cl. .......................................... 269/6; 269/53
[58] Field of Search .................. 269/3, 6, 53, 54

[56] References Cited

U.S. PATENT DOCUMENTS

| 1,220,423 | 3/1917 | Huisinger et al. | 269/6 |
| 1,241,338 | 9/1917 | Brown | 269/3 |
| 3,010,500 | 11/1961 | Jordan | 269/3 |

Primary Examiner—Robert C. Watson
Attorney, Agent, or Firm—H. Dale Palmatier

[57] ABSTRACT

A hand utensil for holding a citrus fruit including a bowl-shaped cover, a plurality of gripping arms within the cover and movably inwardly and outwardly to grip and release the piece of fruit; the arms being displaceable endwise outwardly to release the fruit; there being means to spread the arms apart as they are longitudinally displaced; and a push button movable relative to the cover to displace the arms endwise outwardly.

16 Claims, 7 Drawing Figures

HAND UTENSIL FOR HOLDING A CITRUS FRUIT

This invention relates to a hand utensil for holding a citrus fruit or a half of a citrus fruit. Such a hand utensil is intended in particular to facilitate handling fruits when cutting them in half and handling the fruit halves when extracting the juice from them or removing the flesh with a spoon.

Swiss Patent Spec. No. 549,373 describes a citrus fruit squeezer which differs from customary household fruit squeezers having, for instance, a dome-shaped squeezer cone, in that the cone has an upstanding spike or base, whilst a holder part, having an approximately bowl-shaped cover which may be so placed on the skin side of a fruit half that the fruit is prevented from turning relative to the cover, has a spike complementary to the bore or a bore complementary to the spike. The spike and the bore bring about an axial and radial guidance of the cover relative to the squeezer cone, so that the fruit half is squeezed firmly from both sides.

This known hand utensil has certain disadvantages. Above all of the particular part provided with the spike is dangerous to handle owing to the unavoidable risk of injury; this is somewhat less if the holder part carries the spike, but the holder part cannot then be used to guide the piece of fruit when it is being cut in half.

Such a holder part with a spike is, however, desirable so that the citrus fruit skins which have been sprayed with insecticides and other chemicals do not need to be touched. Furthermore, such a holder part can only be used with a squeezer provided with a corresponding hole. Also, whichever part has the spike, the skin rests firmly on the spike after squeezing out the juice and has to be removed by hand.

It is an object of the invention to provide an improved hand utensil for holding a citrus fruit or a piece of citrus fruit.

According to the invention there is provided a hand utensil for holding a citrus fruit or a piece of citrus fruit, the utensil comprising a bowl-shaped cover for placing over the skin of a fruit or a piece of fruit, gripping means mounted within the cover for gripping the fruit and including a plurality of gripping arms moveable between a first gripping position and a second releasing position, the gripping portions of the gripping arms being further from the axis of the cover in the releasing position than in the gripping position.

According to another aspect of the invention there is provided a hand utensil for holding a citrus fruit or a piece of citrus fruit, the utensil comprising a bowl-shaped cover for placing over the skin of the fruit or the piece of fruit, gripping means mounted within the cover for gripping the fruit and including a plurality of gripping arms manually displaceable along the axis of the cover between a first inner position and a second outer position in which the arms are further from the axis of the cover then in the inner position.

In the inner position, preferably under spring bias, the arms hold the piece of fruit or the half of the piece of fruit firm in a reliable manner, so that the piece of fruit can be cut and squeezed after which the squeezed-out skin can be ejected by separating the arms; this ejection may be assisted by an ejector member. For holding pieces of fruits of varying size, each arm may include at least two projections with shark-like teeth. The separation and drawing in of the arms may be effected by positive guidance or by additional springs or even by the inherent resilience of the material used. All the components of the utensil, with the exception of the spring (s), are preferably one-piece, injection-moulded plastic parts.

According to another aspect of the invention there is provided a fruit squeezer having an approximately dome-shaped squeezer cone for squeezing the juice from fruit halves which are held by means of a utensil (as defined above) wherein the squeezer cone has an upper section with a first conic angle and a lower cone section with a second conic angle larger than the first conic angle.

Such a squeezer may be dimensioned so that it can be used with the smallest citrus fruits (oranges) on the market as well as the largest (grapefruits).

By way of example only, certain illustrative embodiments of the invention will now be described with reference to the accompanying drawings, of which:

Figure 1:
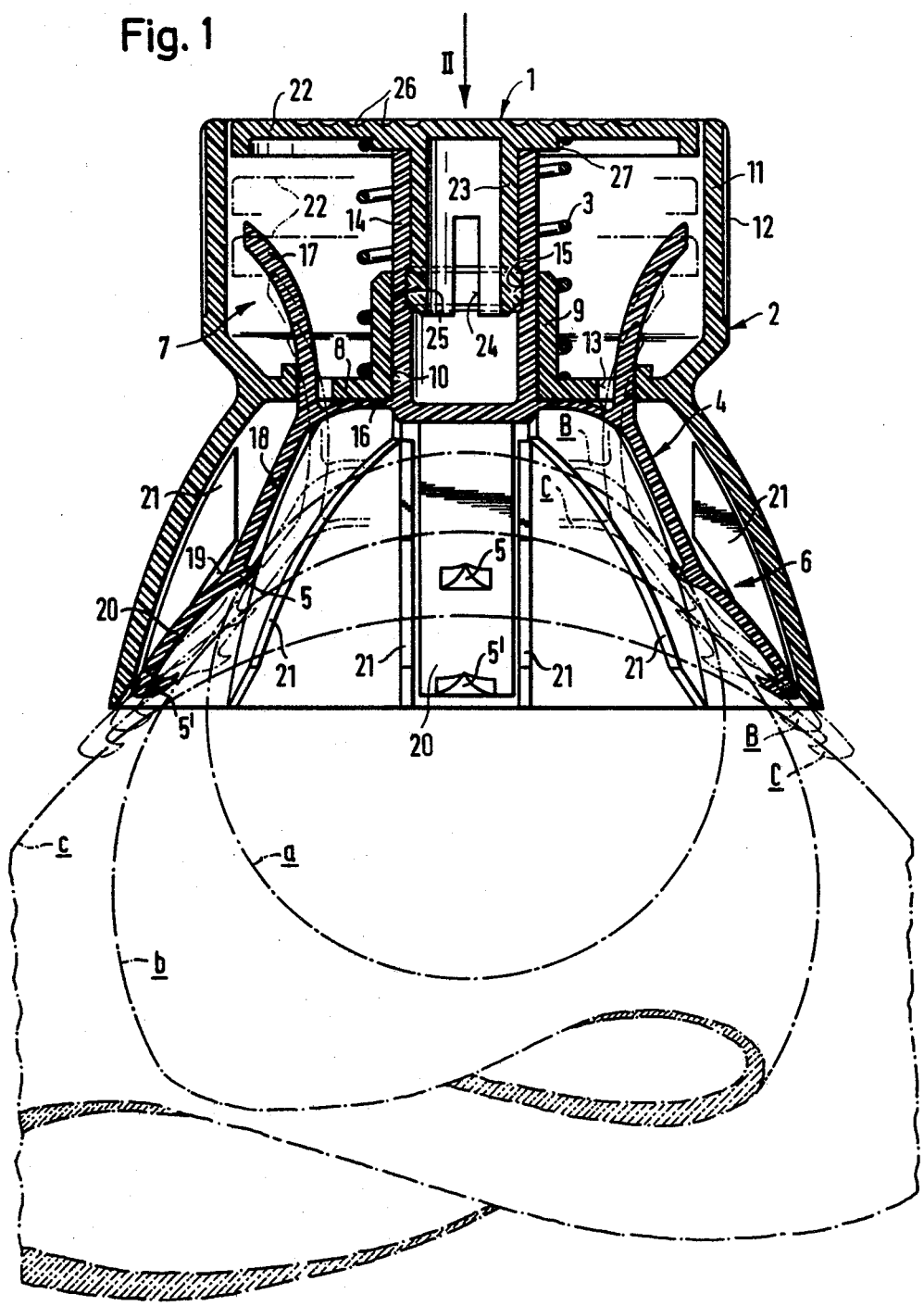
FIG. 1 is a sectional side view of a hand utensil embodying the invention

The hand utensil shown in FIG. 1 consists of four basic parts: a button 1, a cover 2, a spring 3 and a clamp or gripping means 4.

The cover 2 is constructed as a housing having a lower chamber 6, the inner cross-section and longitudinal section of which are matched in the shape of a dome to the external shape of citrus fruits, and having an upper chamber 7 which is cylindrical. The chambers 6 and 7 are separated from one another by a transverse wall 8 which has central opening 10 surrounded by a tubular flange 9. The tubular flange 9 extends upwards into the chamber 7 and is approximately half as high as an outer wall 11 of the cover.

The external surface of outer wall 11 is knurled, the knurling taking the form of longitudinal ribs 12 or the like. Further, the wall 8 has another four openings 13 which are angularly spaced at intervals of 90° with respect to one another. The cover is preferably injection-moulded form plastics material.

The clamp 4 is also an injection-moulded part of plastics material. It comprises a central guide sleeve 14 which is slidingly accommodated in the opening 10 defined by the tubular flange 9 and which in this region has an internal circumferential groove 15. From the closed, lower end of the guide sleeve 14, there extend spaced at intervals of 90° with respect to one another, four gripping arms 16 each having an upper limb 17 and a lower limb 18. The upper limb 17 projects in each case through one of the openings 13 and is slidingly guided in this opening. The lower limb 18 initially extends straight outwards at an angle and then after a bending point 19 extends into a claw 20. Both at the bending point 19 and at the end of the claw 20 there is radially inwardly directed (that is, facing the axis of the utensil), tooth 5, 5', respectively, the tip of which is directed axially inwardly (that is, facing the wall 8). In the rest position, illustrated by a solid line, of the clamp in the cover, the ends of the claws 20 lie just inside the lower edge of the outer wall, which defines the lower chamber 6. This outer wall is reinforced by axial ribs 21 between the limbs 18 of the clamp.

The button 1 (likewise an injection-moulded part of plastics material), covers with a disc portion 22 an upper openings of the upper chamber 7 and rests with an axial tube 23 in the guide sleeve 14 of the clamp 4. The axial tube 23 is slotted longitudinally (two or more slots 24) so that the separate sectors of the axial tube can move resiliently inwards; at its lower end, the axial tube has a collar portion 25 which fits into the groove 15 of the guide sleeve 14. The disc portion is made easy to grip on its outer side by circular grooves 26 or by the like. A flange or collar 27 on the underside of the disc portion is matched to the inner diameter of the helical spring 3; the outer diameter of the tubular flange 9 is similarly matched.

During assembly, the clamp with its guide sleeve 14 is first of all inserted into the opening 10 of the cover, and then the upper limbs 17 of the arms are passed through the opening 13. The spiral spring 3 is then inserted into the upper chamber 7 of the cover, the spring being prevented from kinking outwards by the tubular flange 9, and the button with its axial tube is pushed into the guide sleeve 14, the sectors of the axial tube bending inwards until the collar 25 snaps into the radial groove 15.

If the cover 2 is now gripped by the wall of the upper chamber and if the disc portion 22 of the button is depressed with a finger, then the clamp is pushed downwards against the force of the spring 3. In so doing, guided by the openings 13 the outwardly curving upper limbs 17 of the clamp arms in the upper chamber 7 are pushed inwards and in a corresponding manner the lower limbs 18 are forced apart. The inward pushing motion of the button is restricted by the axial distance between the upper end face of the flange 9 and the underside of the collar 27 on the disc portion. In this lower end position, the entire hand utensil is placed on a citrus fruit (half), it being necessary to exert only a very moderate pressure, and the button is released. Depending on the size of the fruit the button is now pushed back by the spring 3 to a greater or lesser extent. In the case of very small pieces of fruit, marked a in FIG. 1, the teeth 5 penetrate into the peel of the fruit and hold the fruit (half) securely, the initial or rest position illustrated with solid lines being achieved again. Medium-sized pieces of fruit too (b) are gripped by the teeth 5 but the clamp and button return only to a middle position B indicated by a dot-dash line. In the case of very large pieces of fruit (grapefruit, size c), the lower teeth 5' at the ends of the claws grip the fruit and the spring moves the clamp back only slightly, (position C) when the button is released.

Figure 5:
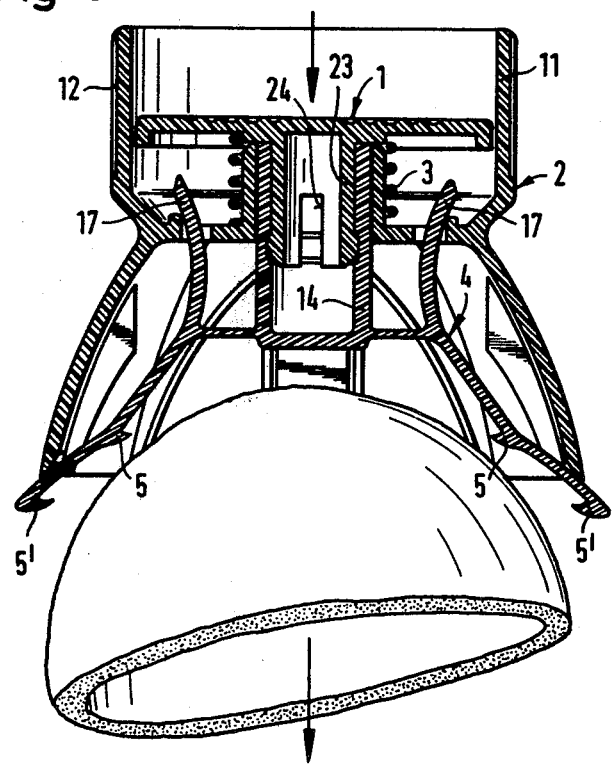
FIG. 5 shows in an illustrative similar to that of FIG. 1, another working position of the components of the first embodiment.
Figure 7:
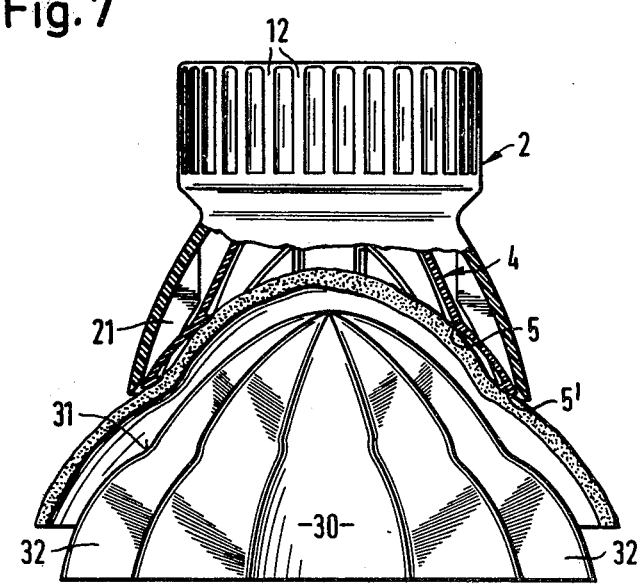
FIG. 7 shows a hand utensil embodying the invention together with a juice squeezer for use with the utensil.

After cutting the fruit and squeezing out the fruit halves or spooning out the flesh, a push on the button is sufficient to cause the skins to fall out (FIG. 5). The squeezing process is facilitated by ribs 12; the arms of the clamp cannot bend outwards and their lower limbs are secured by the axial ribs 21 against twisting relative to the cover. In the case of very large pieces of fruit, the part of the fruit halves near to their cut face is no longer enclosed by the cover. So that the juice can be completely squeezed out from this part of the piece of fruit, it is an advantage to co-ordinate with the apparatus (which moreover, may be used with all commercially available fruit squeezers with squeezer cones) a fruit squeezer with a specially shaped squeezer cone. This is indicated in FIG. 7. For as far as the cover extends in the axial direction, the cone 30 is shaped approximately to correspond with it, but in its lower region it is stepped outwards at 31 to provide projecting ribs 32.

Figure 2:
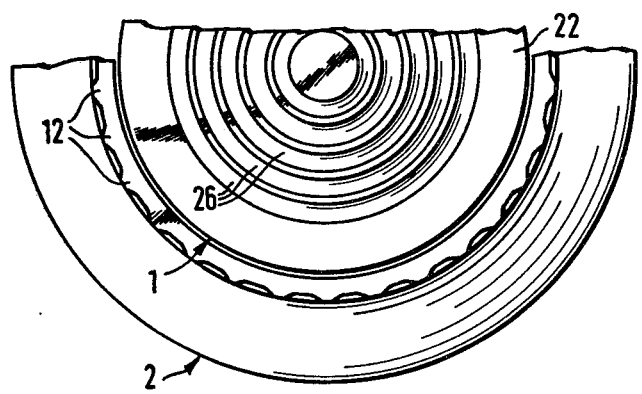
FIG. 2 is a plan view of part if the utensil shown in FIG. 1
Figure 3:
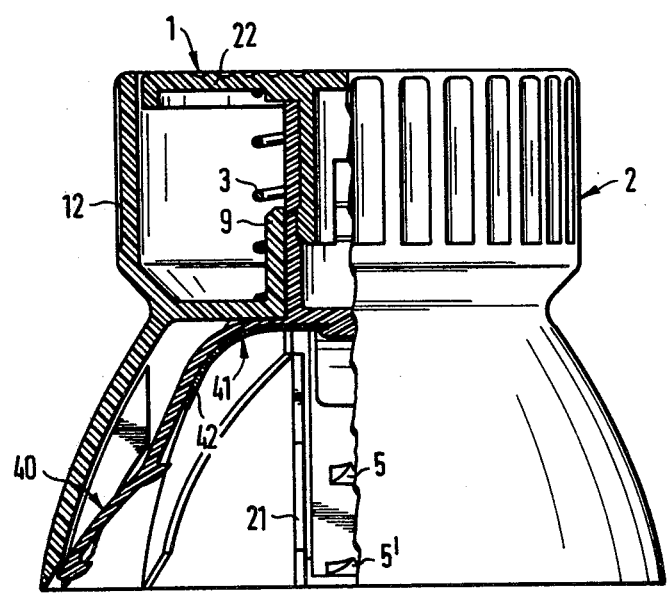
FIGS. 3 and 4 are partly sectional side views of a second and third embodiment, respectively, of a hand utensil.
Figure 4:
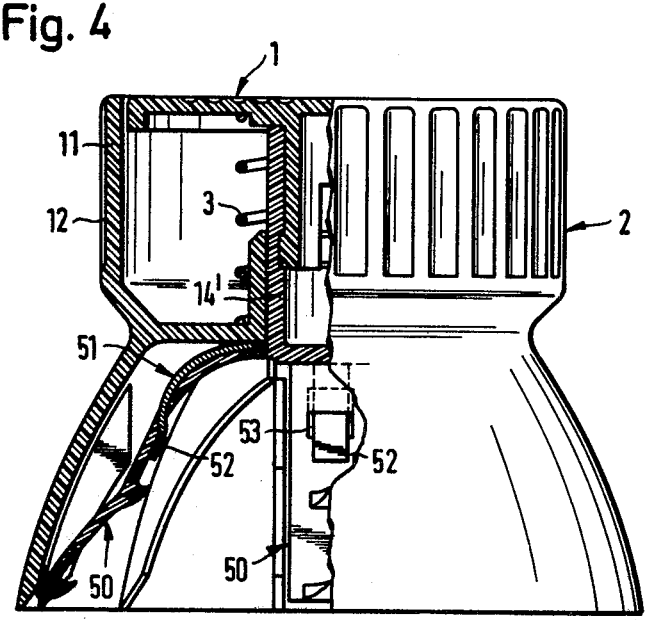

Whereas in the embodiment shown in FIGS. 1, 2 and 5, the outward opening of the arms was affected by means of curving guidance of the upper limbs 17, in the embodiments shown in FIGS. 3 and 4 the clamp has only lower limbs 40 (FIG. 3) or 50 (FIG. 4). For the separating process a four armed flat spring 41, 51 respectively, is provided, whose spring arms 42, 52, respectively, having an outwardly directly bias, are each assigned to a limb 40, 50 respectively. In the embodiment shown in FIG. 3, the spring 41 is positioned beneath the clamp body and anchored near to its centre, for instance by injection-moulding it on, or snapping it on. The spring arms of the springs press beneath the limbs 40.

In the embodiment according to FIG. 4 on the other hand, the spring fits with a central opening over the guide sleeve 14' of the clamp and its central part consequently lies above the clamp arms 50. The free end of each spring arm however, is pushed through an opening 53 of the relevant clamp arm limb, so that here too the limbs are forced outwards because the spring end acts from below.

In all embodiments, in the central region of the clamp an extension may project downwards, that is towards a piece of fruit, to such an extent, then when the skins are ejected, (FIG. 5) not only are the teeth 5, 5', respectively, released, but this extension also exerts a pressure centrally on the skin, and in so doing reliably prevents the skin from remaining on the utensil. This ejector extension may, for example, have the shape of a short piece of tube or the like.

Figure 6:
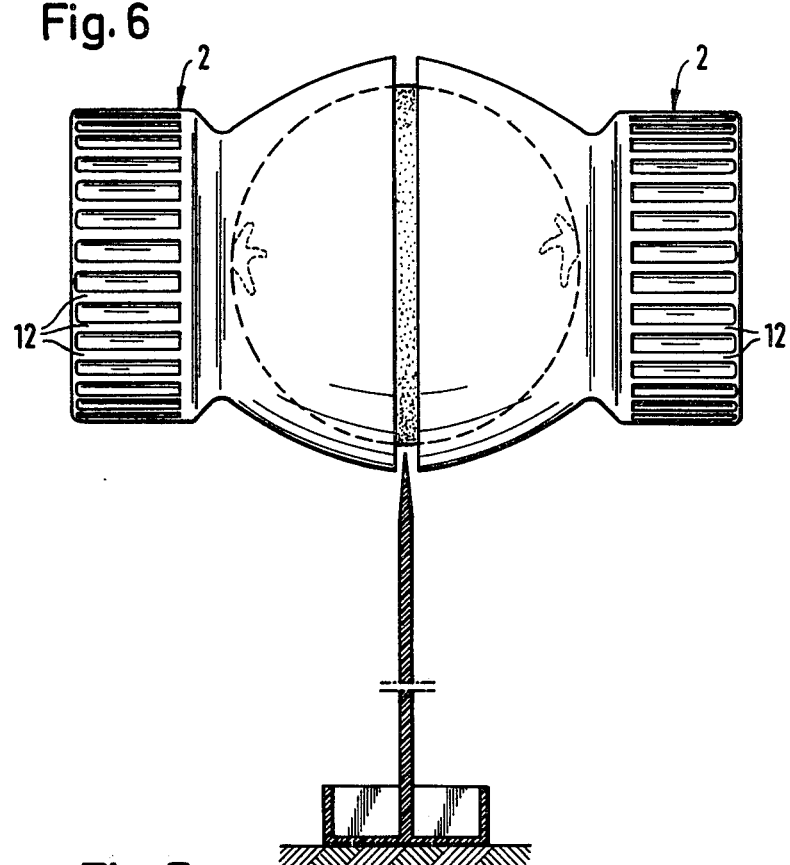
FIG. 6 illustrates the use of two hand utensils embodying the invention with a cutting device.

FIG. 6 shows that with the help of two hand utensils embodying the invention, using a device for cutting fruit which has already been proposed per se, even the smallest oranges on the market can be cut in half if the dimensions of the cover and the clamp are chosen to be correspondingly small. It has already been mentioned above (FIG. 7) that the largest grapefruit on the market can be squeezed out with the help of the hand utensil, particularly using a correspondingly adapted cone-type squeezer.

The hand utensil may also be used to place a half a piece of fruit firmly on a plate, when it is intended not to squeeze out the juice but to remove the flesh with a soon.

Although it is preferred to injection mould the components, with the exception of the spring (s) from plastics material, it may also be economical to punch and press out at least the clamp from a corrosion-resistant material, for instance stainless steel. In such a construction, the inherent resilience of the material may suffice to bring about the radial stressing without any other structural auxiliarly means.

The hand utensils described above are suitable for all citrus fruits to be cut in half before consumption; they enable the juice of the fruit halves to be squeezed out even with standard cone-type fruit squeezers; they permit the skin of the fruit from which the juice has been squeezed or from which the flesh has been removed with a spoon to be ejected; moreover they can be manufactured at a reasonable costs.

What I claim is:

1. A hand utensil for holding a citrus fruit or a piece of citrus fruit, the utensil comprising a bowl-shaped cover for placing over the skin of a fruit or a piece of fruit, gripping means mounted within the cover for gripping the fruit and including a plurality of gripped arms with gripping portions and movable between a first gripping position and a second releasing position, the gripping portions of the gripping arms being further from the axis of the cover in the releasing position than in the gripping position, the arms being movable along the bowl-shaped cover while moving between said first gripping and second releasing positions.

2. A hand utensil for holding a citrus fruit or a piece of citrus fruit, the utensil comprising a bowl-shaped cover for placing over the skin of a fruit or a piece of fruit, gripping means mounted within the cover for gripping the fruit and including a plurality of gripping arms manually displaceable relative to the cover and along the axis of the cover between a first inner position and a second outer position in which the arms are further from the axis of the cover than in the inner position.

3. A hand utensil according to claim 2 in which the gripping arms are restrained against rotational movement relative to the cover.

4. A hand utensil according to claim 2 in which four gripping arms are provided.

5. A hand utensil according to claim 2 further including a spring which biasses the arms to the inner position.

6. A hand utensil according to claim 5 further including a button on the cover and connected with the arms for effecting the axial displacement of the arms against the spring bias to the outer position.

7. A hand utensil according to claim 6 in which the button is a one-piece part of plastics material.

8. A hand utensil according to claim 6 wherein a central guide sleeve is disposed on the gripping arms, which guide sleeve is secured by a snap fit onto a tubular section of the button which tubular section rests in the guide sleeve, and wherein the spring is a helical spring surrounding the sleeve and tubular section and anchored against the bowl-shaped cover.

9. A hand utensil according to claim 8 in which the cover has a first chamber enclosing the gripping arms, and a second approximately cylindrical chamber separated from the first by a wall, the button being guided in the second chamber into which the guide sleeve projects and the spring extending between the wall of the cover and the button.

10. A hand utensil according to claim 2 in which there is provided guide means on the cover and a plurality of guide members on the gripping means for separating the gripping arms when displacing the arms into the outer position and for drawings in the arms when displacing them into the inner position.

11. A hand utensil according to claim 2 in which at least one of the group consisting of the cover and the gripping means is a one-piece part of plastics material.

12. A hand utensil according to claim 2 in which the gripping means is a punched out and pressed part made of resiliently deformable metal.

13. A hand utensil according to claim 2 in which the gripping means comprises a part of plastics material and a metal spring secured thereto for separating the gripping arms when displacing them into their outer position.

14. A hand utensil according to claim 2 in which each gripping arm is provided with at least two radially inwardly directed teeth axially spaced along the arm with their tips pointing axially inwardly.

15. A hand utensil according to claim 2 and the cover having ribs on the inner side thereof and on both sides of each gripping arm for supporting the piece of fruit and for preventing the arms from rotating relative to the cover.

16. A hand utensil according to claim 2 in which the axial and radial dimensions of the cover and the gripping means are smaller than the corresponding dimensions of the smallest halves of citrus fruit to be held.

* * * * *